United States Patent
BuAbbud

(10) Patent No.: US 7,058,966 B2
(45) Date of Patent: Jun. 6, 2006

(54) OPTICAL COMMUNICATION SYSTEM FOR TRANSMITTING RF SIGNALS DOWNSTREAM AND BIDIRECTIONAL TELEPHONY SIGNALS WHICH ALSO INCLUDE RF CONTROL SIGNALS UPSTREAM

(75) Inventor: George H. BuAbbud, Southlake, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 1060 days.

(21) Appl. No.: 09/879,395

(22) Filed: Jun. 12, 2001

(65) Prior Publication Data

US 2002/0015203 A1   Feb. 7, 2002

Related U.S. Application Data

(63) Continuation of application No. 09/309,717, filed on May 11, 1999.

(51) Int. Cl.
H04N 7/173 (2006.01)

(52) U.S. Cl. .................. 725/106; 725/122; 725/129

(58) Field of Classification Search ............ 725/106, 725/122, 126, 129; 398/135–139; 385/31
See application file for complete search history.

(56) References Cited

U.S. PATENT DOCUMENTS

| | | | |
|---|---|---|---|
| 4,058,672 A | 11/1977 | Crager et al. |
| 4,408,323 A | 10/1983 | Montgomery |
| 4,476,559 A | 10/1984 | Brolin et al. |
| 4,491,983 A | 1/1985 | Pinnow et al. |
| 4,534,024 A | 8/1985 | Maxemchuk et al. |
| 4,577,314 A | 3/1986 | Chu et al. |
| 4,592,048 A | 5/1986 | Beckner et al. |
| 4,686,667 A | 8/1987 | Ohnsorge |
| 4,730,311 A | 3/1988 | Carse et al. |
| 4,763,317 A | 8/1988 | Lehman et al. |
| 4,768,188 A | 8/1988 | Barnhart et al. |
| 4,771,425 A | 9/1988 | Baran et al. |
| 4,787,693 A | 11/1988 | Kogelnik et al. |
| 4,881,225 A | 11/1989 | Dyke et al. |
| 4,888,765 A | 12/1989 | Dyke |
| 4,891,694 A | 1/1990 | Way |
| 4,903,292 A | 2/1990 | Dillon |
| 4,962,497 A | 10/1990 | Ferenc et al. |
| 4,967,193 A | 10/1990 | Dyke et al. |

(Continued)

FOREIGN PATENT DOCUMENTS

EP   0499065   8/1992

(Continued)

OTHER PUBLICATIONS

Boettle, Dietrich, et al., "Hybrid Fiber Radio Access Networks: Architecture Potential and Evolution", Broadband Access and Technology, D.W. Faulkner and A.L. Harmer (Eds.)., IOS Press, 1999, AKM, pp. 239-244.

(Continued)

*Primary Examiner*—Vivek Srivastava
(74) *Attorney, Agent, or Firm*—Baker Botts L.L.P.

(57) ABSTRACT

A method of transmitting TV signals and bidirectional telephone communication signals on a single optical fiber, existing telephone twisted pair infrastructure, and existing coaxial cable infrastructure. In addition to allowing the downstream transmission of television channels as well as bidirectional telephone communication, the single optical fibers also provides for the upstream travel of television related signals while requiring minimal changes of the existing infrastructure.

23 Claims, 3 Drawing Sheets

U.S. PATENT DOCUMENTS

| | | | |
|---|---|---|---|
| 5,014,266 A | 5/1991 | Bales et al. | |
| 5,022,752 A | 6/1991 | Bu-Abbud | |
| 5,046,067 A | 9/1991 | Kimbrough | |
| 5,136,411 A | 8/1992 | Paik et al. | |
| 5,142,532 A * | 8/1992 | Adams | 370/432 |
| 5,193,110 A | 3/1993 | Jones et al. | |
| 5,202,780 A | 4/1993 | Fussanger | |
| 5,247,347 A | 9/1993 | Litteral et al. | |
| 5,263,081 A | 11/1993 | Nightingale et al. | |
| 5,267,122 A | 11/1993 | Glover et al. | |
| 5,287,344 A | 2/1994 | Bye et al. | |
| 5,303,229 A | 4/1994 | Withers et al. | |
| 5,325,223 A | 6/1994 | Bears | |
| 5,341,374 A | 8/1994 | Lewen et al. | |
| 5,349,457 A | 9/1994 | Bears | |
| 5,351,148 A * | 9/1994 | Maeda et al. | 398/76 |
| 5,355,362 A | 10/1994 | Gorshe et al. | |
| 5,381,405 A | 1/1995 | Daugherty et al. | |
| 5,383,180 A | 1/1995 | Kartalopoulos | |
| 5,398,129 A | 3/1995 | Reimann | |
| 5,421,030 A | 5/1995 | Baran | |
| 5,463,616 A | 10/1995 | Kruse et al. | |
| 5,469,282 A | 11/1995 | Ishioka | |
| 5,479,286 A | 12/1995 | Stalley et al. | |
| 5,491,797 A | 2/1996 | Thompson et al. | |
| 5,499,241 A | 3/1996 | Thompson et al. | |
| 5,500,753 A | 3/1996 | Sutherland | |
| 5,504,606 A | 4/1996 | Frigo | |
| 5,526,350 A | 6/1996 | Gittins et al. | |
| 5,526,353 A | 6/1996 | Henley et al. | |
| 5,539,564 A * | 7/1996 | Kumozaki et al. | 398/2 |
| 5,544,163 A | 8/1996 | Madonna | |
| 5,544,164 A | 8/1996 | Baran | |
| 5,546,483 A | 8/1996 | Inoue et al. | |
| 5,553,311 A | 9/1996 | McLaughlin et al. | |
| 5,555,244 A | 9/1996 | Gupta et al. | |
| 5,566,239 A | 10/1996 | Garcia et al. | |
| 5,572,347 A | 11/1996 | Burton et al. | |
| 5,579,328 A | 11/1996 | Habel et al. | |
| 5,586,121 A | 12/1996 | Moura et al. | |
| 5,594,734 A | 1/1997 | Worsley et al. | |
| 5,600,469 A | 2/1997 | Yamazaki | |
| 5,608,565 A | 3/1997 | Suzuki et al. | |
| 5,617,423 A | 4/1997 | Li et al. | |
| 5,623,490 A | 4/1997 | Richter et al. | |
| 5,640,387 A | 6/1997 | Takahashi et al. | |
| 5,680,238 A * | 10/1997 | Masuda | 398/76 |
| 5,729,370 A | 3/1998 | Bernstein et al. | |
| 5,742,414 A | 4/1998 | Frigo et al. | |
| 5,742,596 A | 4/1998 | Baratz et al. | |
| 5,761,307 A | 6/1998 | Mohrmann et al. | |
| 5,784,377 A | 7/1998 | Baydar et al. | |
| 5,808,767 A | 9/1998 | Williams et al. | |
| 5,842,111 A * | 11/1998 | Byers | 725/131 |
| 5,854,702 A * | 12/1998 | Ishikawa et al. | 398/137 |
| 5,861,966 A | 1/1999 | Ortel | |
| 5,864,413 A | 1/1999 | Feldman et al. | |
| 5,864,415 A | 1/1999 | Williams et al. | |
| 5,870,395 A | 2/1999 | Baran | |
| 5,872,645 A | 2/1999 | Proctor | |
| 5,880,864 A | 3/1999 | Williams et al. | |
| 5,880,865 A | 3/1999 | Lu et al. | |
| 5,912,998 A | 6/1999 | Quayle | |
| 5,930,015 A | 7/1999 | Yamamoto et al. | |
| 5,956,168 A * | 9/1999 | Levinson et al. | 398/41 |
| 5,969,836 A * | 10/1999 | Foltzer | 398/72 |
| 5,995,491 A | 11/1999 | Richter et al. | |
| 6,031,645 A | 2/2000 | Ichikawa | |
| 6,061,481 A * | 5/2000 | Heidrich et al. | 385/14 |
| 6,144,473 A | 11/2000 | Rokhsaz et al. | |
| 6,163,537 A | 12/2000 | Thacker | |
| 6,181,867 B1 | 1/2001 | Kenner et al. | |
| 6,262,997 B1 | 7/2001 | Quayle | |
| 6,288,809 B1 | 9/2001 | Touma et al. | |
| 6,317,234 B1 | 11/2001 | Quayle | |
| 6,356,736 B1 | 3/2002 | Tomasz et al. | |
| 6,411,410 B1 | 6/2002 | Wright et al. | |
| 6,460,182 B1 | 10/2002 | BuAbbud | |
| 6,493,335 B1 | 12/2002 | Darcie et al. | |
| 6,538,781 B1 | 3/2003 | Beierle et al. | |
| 6,552,832 B1 | 4/2003 | Beierle et al. | |
| 6,577,414 B1 | 6/2003 | Feldman et al. | |
| 6,628,771 B1 | 9/2003 | Frise et al. | |
| 6,633,635 B1 | 10/2003 | Kung et al. | |
| 6,771,909 B1 * | 8/2004 | Farhan et al. | 398/72 |
| 2001/0030977 A1 | 10/2001 | May | |

FOREIGN PATENT DOCUMENTS

| | | |
|---|---|---|
| EP | 0593947 | 4/1994 |
| EP | 0690591 | 1/1996 |
| EP | 690591 | 1/1996 |
| EP | 789470 | 8/1997 |
| EP | 829995 | 3/1998 |
| JP | 09284231 | 10/1997 |
| WO | WO9115064 | 10/1991 |
| WO | WO9505041 | 2/1995 |
| WO | WO 9834379 | 8/1998 |
| WO | WO0069104 | 11/2000 |

OTHER PUBLICATIONS

DeTreville, J.D., "A Simulation-Based Comparison of Voice Transmissions on CSMA/CD Networks and on Token Buses", AT&T Bell Laboratories Technical Journal, vol. 63, No. 1, Jan. 1984, pp. 33-56.

Ishikawa, et al., "A New Polarization-Independent LinB03 Waveguide Optical Modulator for Bidirectional Transmission in Optical Catv Subscriber Systems", Proceedings of the European Conference on Optical Communication (ECOC), Frankfurt, Germany, vol. Conf. 18, Sep. 27, 1992, pp. 293-296.

Montgomery, Warren A., "Techniques for Packet Voice Synchronization", vol. Sac-1, No. 6, Dec. 1983, pp. 1022-1028, IEEE Journal on Selected Areas in Communications.

Perlman, R., "Interconnections: Bridges and Routers", Addison-Wesley, 1992, p. 36.

Masakuzu Kitazawa, Masatoshi Yamazaki, Susumu Hiti, "Fiber-Optic Subscriber System Based on Poassive Optical Network Arthitecture," Hitachi Review, vol. 43 (1994), No. 2.

* cited by examiner

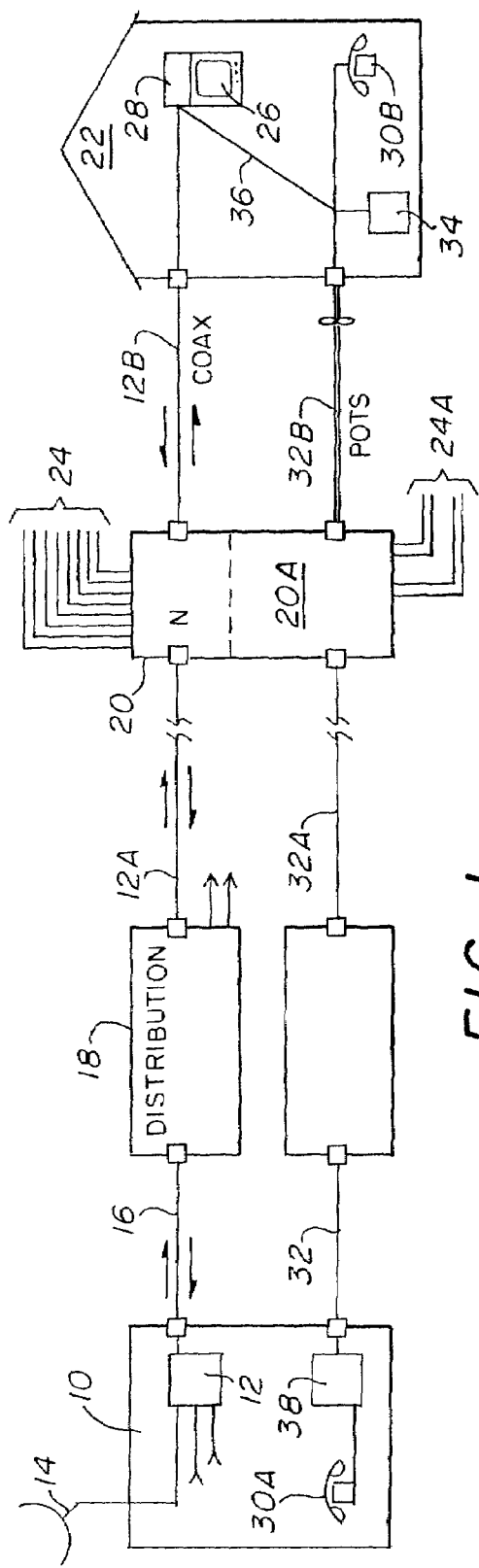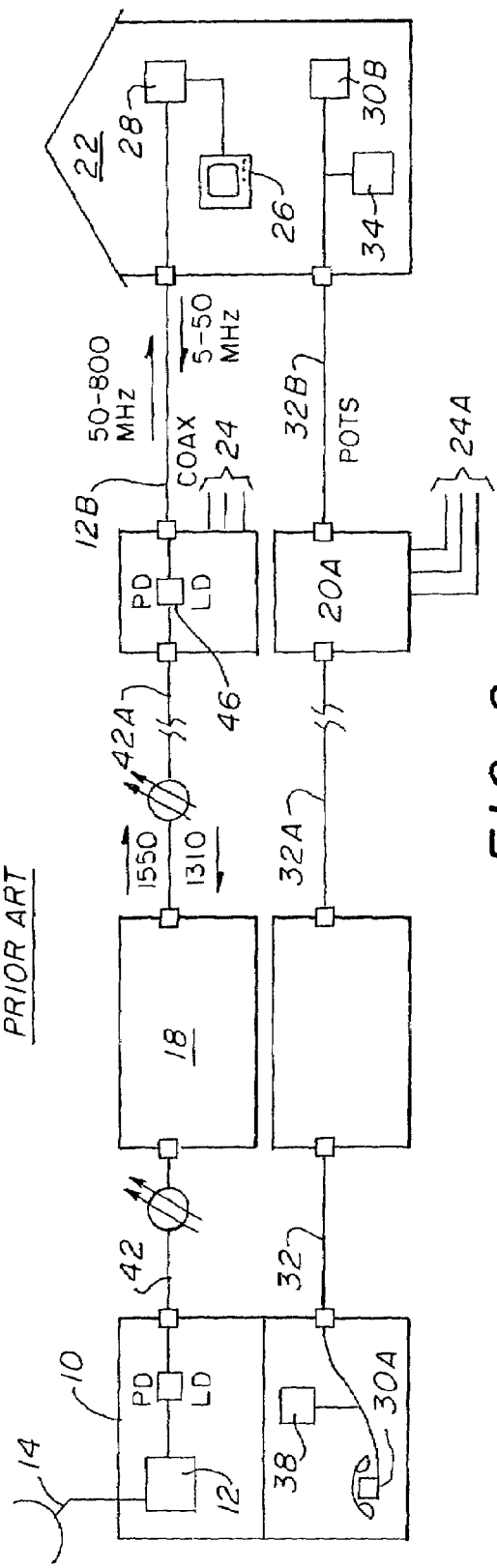

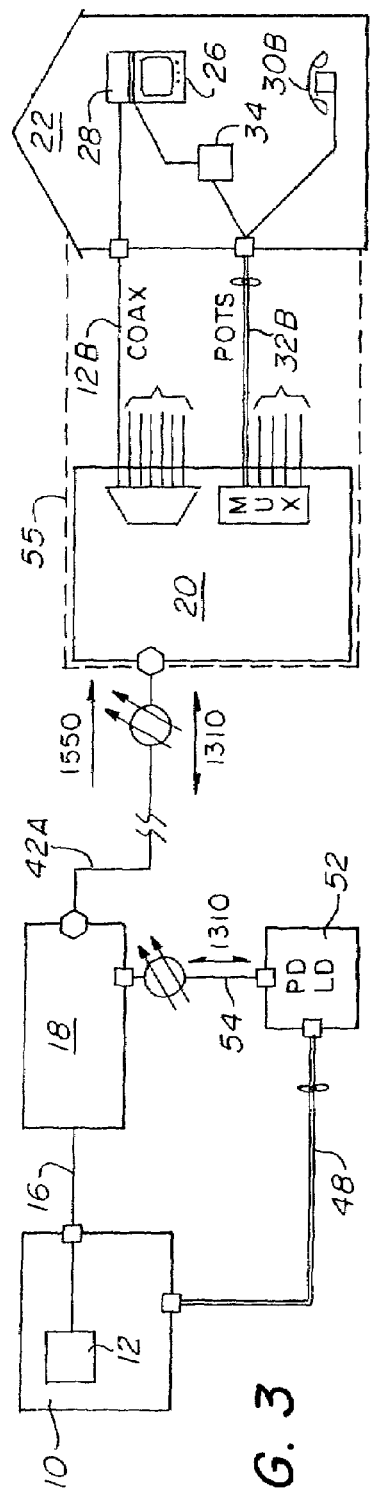
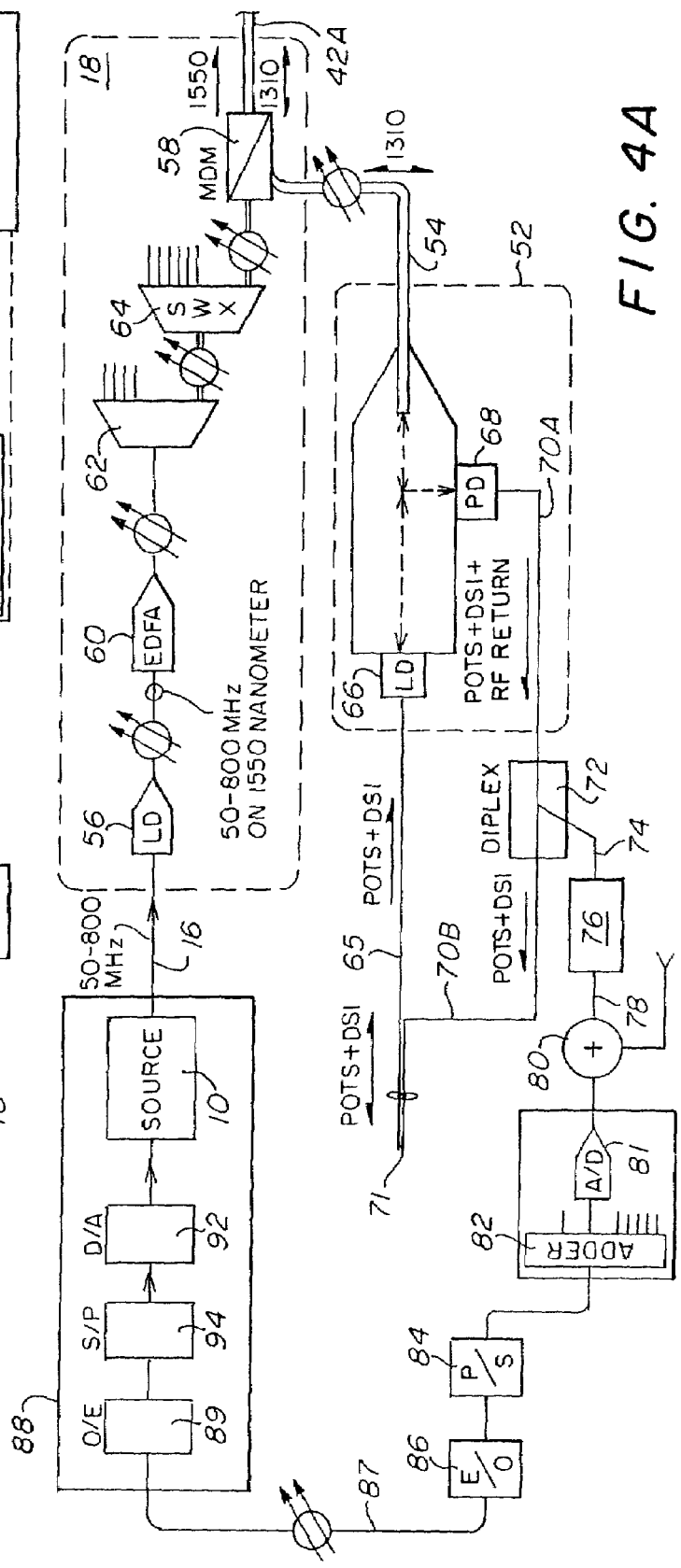
FIG. 3
FIG. 4A

OPTICAL COMMUNICATION SYSTEM FOR TRANSMITTING RF SIGNALS DOWNSTREAM AND BIDIRECTIONAL TELEPHONY SIGNALS WHICH ALSO INCLUDE RF CONTROL SIGNALS UPSTREAM

CROSS REFERENCE TO RELATED APPLICATION

This application is a continuation of U.S. patent application Ser. No. 09/309,717 filed on May 11, 1999.

BACKGROUND OF THE INVENTION

1. Field of the Invention

The present invention relates to methods and apparatus for carrying on simultaneous communications over a single optical fiber by using two different operating frequencies, and more specifically to methods and apparatus for use with WDM (wave division multiplexing) at two different wavelengths of light to provide bidirectional telephonic communication using TDM (time division multiplexing) at one wavelength of light and transmitting TV signals down stream only at another wavelength. TV control signals are returned by the telephonic communication path to the TV source by multiplexing the control signals with the telephonic signals.

2. Description of Related Art Including Information Disclosed Under 37 CFR 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable.

Of course, modern telephone systems require bidirectional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still used in part of the transmission path. It is especially used as the signals get closer to the end users. Although twisted pairs and coaxial cables are used in homes and distribution terminals close to the home end user, some modern telecommunication systems now use micro-wave and optic fibers as transmission mediums. In addition TCM (time compression multiplexing) is often used in optical transmission so that a signal optical fiber can carry communications in both direction.

However, because of extremely high band widths available for use by an optical fiber, a single fiber is quite capable of carrying a great number of communications in both directions. One technique of optical transmission is WDM (wavelength divisional multiplexing) and uses different wavelengths for each direction of travel.

Yet another and simpler technique for using a single optical fiber for telephone systems is TCM (time compression multiplexing) and is sometimes referred to as a "ping-pong" system. The system operates at a single frequency or wavelength of light and uses a single optical fiber and often even a single diode, for both converting electrical signals to optical signals and converting received optical signals to electrical signals. TCM systems have the obvious advantage of requiring fewer components.

However, as mentioned above, optical fibers have extremely high band widths and use of an optical fiber for a single ping-pong telephone channel is a very ineffective use of the fiber and, in fact, the available bandwidth of an optical fiber makes it possible to use a transmission technique such as TCM or ping-pong at one frequency and then by the use of WDM technology to use another technique at a second frequency.

Another area of rapidly growing technology is providing unidirectional TV signals by cable to a multiplicity of subscribers or users. In the past, such signals were and still are typically transmitted by the use of coaxial cables (e.g. cable TV). However, the use of optical fibers for transmission allows broad band transmission to a large numbers of customers and, since substantially all of the transmission of TV signals is one way (i.e. unidirectional), if a single optical fiber were used solely for the TV signals there would be almost no use of the selected wavelength of light for carrying return signal, which are typically control or information signals.

Therefore, a technique for transmitting bidirectional telephonic signals and unidirectional TV signals would make efficient use of an optical fiber.

It would also be advantageous to provide return control signals to the TV signal source or station with respect to each customer or subscriber without having to dedicate a frequency or wavelength of light full time to said seldom used or RF Return transmitted signals.

SUMMARY OF THE INVENTION

The above objects and advantages are achieved in the present invention by methods and apparatus which comprise transmitting light at a first wavelength to carry telephonic signals between a first telephone-related device and a second telephone-related device, or location and also transmitting light at a second wavelength to carry TV signals from a TV signal source to an end user(s). The wavelengths or light are carried through a single optical fiber from a first-end to a second-end. The first and second wavelengths of light are received at the second-end of the optical fiber, and the signals on the first wavelength of light are detected and converted to first electrical signals at a first frequency band suitable for carrying telephonic signals such as voice telephone and computer modem signal, at a frequency band of about 64 KHz. The received second wavelength of light is also detected, and the detected light is converted to electrical signals, within a second frequency band, typically between 5 and 800 MHZ and are representative of TV channel signals. The telephonic electrical signals are transmitted to a receiving telephone or other telephone-related device and the electrical signals representative of TV signals are transmitted to a TV signal receiving device. The return electrical telephonic signals are then generated at the receiving telephone-related device at the same frequency band the original telephonic signal were transmitted and are representative of return telephone information which could be modem information or voice information. TV related electrical signals such as control signals, information signals or TV show ordering signals are also generated at a third frequency band. The return electrical telephonic signal at the first frequency band of about 64 HKz and the TV related electrical signal generated at about 5 to 50 MHZ are multiplexed together. The multiplexed electrical signals are converted to light signals at the first wavelength and carry both the return telephonic signal and the TV related signal. The light at the first wavelength is transmitted through the single optical fiber from the second end to the first end where it is received and detected such that electrical signals representative of the return telephonic signals and the electrical signal representative of the TV related information are generated. The return electrical telephonic signals are transmitted to the first telephone-related device and the electrical TV related signals are transmitted to the TV signal source.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 1 is a prior art block diagram showing the present transmission and distribution of a typical coaxial TV and POTS telephone system;

FIG. 2 shows a POTS telephone system and a fiber optic TV distribution system having 1550 nanometer light carrying TV signals in one direction and 1310 nanometers of light carrying telephonic signals in both directions;

FIG. 3 shows a block diagram of a preferred embodiment of the present invention incorporating portions of the existing POTS telephone system and the coaxial TV signal distribution system while using a single optical fiber for carrying the TV signals at 1550 nanometers of light downstream and the telephonic signals in both directions at 1310 nanometers; and FIG. 4A and 4B show detailed block diagram of the invention of FIG. 3.

DETAILED DESCRIPTION OF THE PREFERRED EMBODIMENT(S)

Figure 4B:
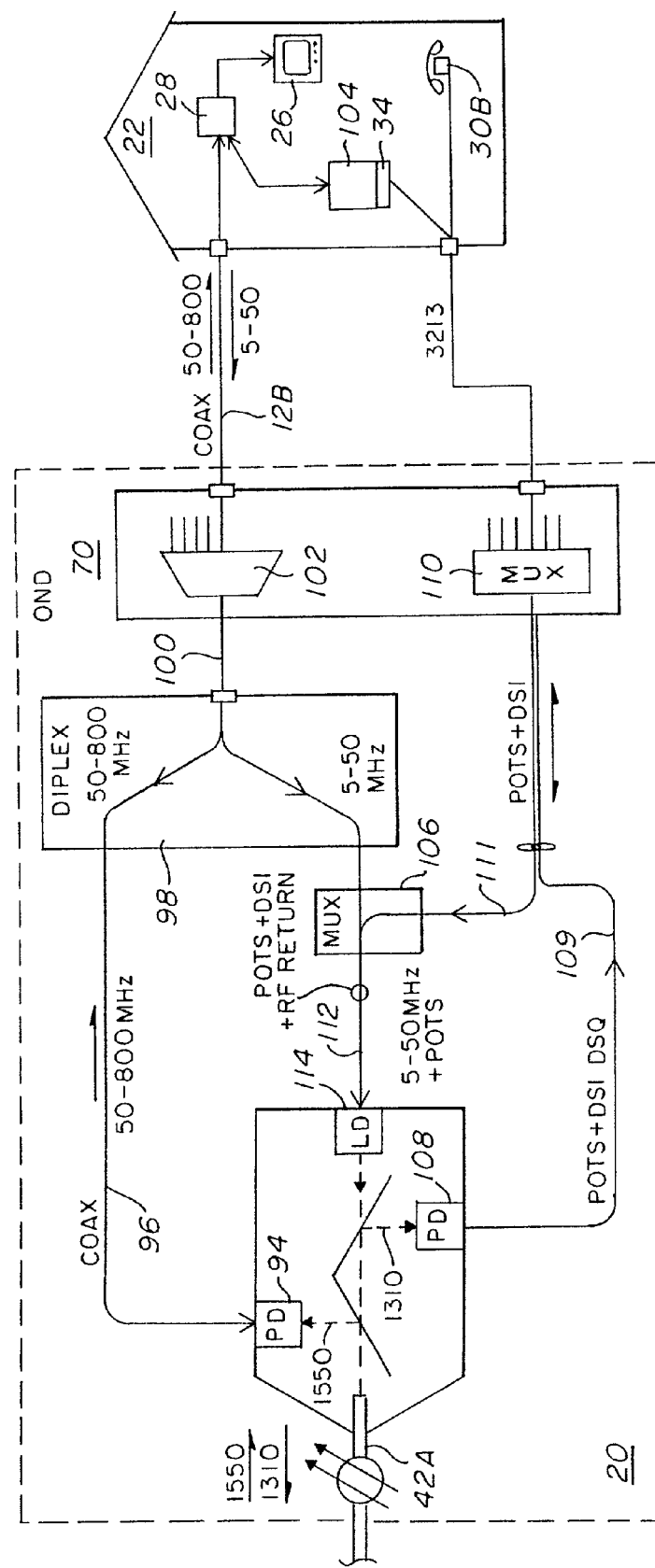

Referring now to FIG. 1, there is shown a typical transmission and distribution system for cable TV and normal telephone service, referred to as POTS (plain old telephone service). As shown, cable TV source location 10 has cable TV transmission equipment 12 which may originate from several sources including a satellite receiver 14. The TV equipment 12 would then amplify this signal and send it out typically on a coaxial line such as line 16 to a distribution system which may include several stations such as station 18 where the signal is again amplified and further distributed to an even larger multiplicity of locations. Such re-amplification and further distribution may occur several times but eventually will arrive at a local distribution terminal 20 by means of a coaxial cable 12A from which it is then distributed to a home or building 22 by a coaxial cable 12B. As shown distribution terminal 20 may also provide TV signals to other buildings or homes such as indicated by bracket 24. Once the TV signal is received at building 22, it will then typically be provided to a TV set 26 directly or to a set-top or cable TV box 28. If the signal is first provided to the set-top box 28, it is then directly provided to TV set 26. It should be appreciated that the direction of travel for such signals is primarily unidirectional and downstream. That is, it travels primarily from the cable The corresponding structures, materials, acts, and equivalents of all means or step plus function elements in the claims below are intended to include any structure, material, or act for performing the function in combination with other claimed elements as specifically claimed. TV signal source 10 to the set-top box 28 in the building or home 22 at frequencies of between 250–800 MHZ. If information is to be carried upstream or back to source 10, it will typically be at between 50–200 MHZ.

Also shown is a typical telephone system or POTS which of course is two-way communication typically carried by means of a twisted pair of wires. In the example shown in FIG. 1, if someone at the cable TV signal source location 10 wishes to talk with someone at building 22, the telephone 30A is used in its normal manner. The two-way conversation is carried on between the person in building 10 using telephone 30A and by a person using telephone 30B in the home or building 22. This communication is typically carried through a pair of twisted wires such as indicated by 32, 32A, and 32B. In recent years, the regular telephone distribution system has also been used to provide communications between computers. This is done by the use of a modem 34 which connects a computer to the telephone line. As was the case with the TV signal distribution, there are typically several stations or substations between the two telephones 30A and 30B located at the building 10 and the building 22, respectively. Such distribution terminals or stations allow telephone services between all subscribers with which we are all well aware. However, as shown at distribution terminal 20A, there may also be several other buildings or homes connected to distribution terminal 20A as indicated by bracket 24A. As was discussed earlier, communications between buildings 10 and 22 were typically accomplished through regular telephone service by individuals talking to each other. However with more efficient automation, telephone lines may also be connected up to the set-top box 28 as indicated by wires 36. In addition, in the distribution terminal 38 at the cable TV signal location, there is also a telephone connection to the TV signal equipment 12, such that it is now possible that movies or information concerning the TV signals and TV equipment can be communicated between the two locations.

As demands increase for more and more TV channels and better and more efficient transmission techniques without disruption and interference, the long runs of coaxial cable are simply becoming inefficient and inadequate. Thus as is shown in FIG. 2, there is an improved system for the transmission of TV signals between the TV signal source location 10 and the building or home 22. In the systems shown in FIG. 2, there is also shown a standard telephone or POTS system as discussed above. In the improved television transmission system, however, the transmission is achieved by a fiber optical cable as indicated by fiber optical cables 42 and 42A. As shown in FIG. 2, the same coaxial cable 12B exist between the distribution terminal 20 and the home of building 22. However, also as shown distribution terminal 20 includes new equipment 46 which receives the transmitted light on fiber optic 42 and converts it to electrical signals and conversely receives electrical signals from 12B and converts the electrical signals to light signals for transmission on fiber optic 42A. However as will be appreciated by those skilled in the art, the TV signals from the TV signal source building 10 normally travel downstream only and are continuous. Thus, if bidirectional communications between the cable TV signal source 10 and the distribution terminal 20 are to take place, some sort of sharing of the individual fiber optic 42A as well as the copper wire 12B must be provided. Thus, in the example shown, the TV signals travel in a single direction (i.e., downstream) from the TV signal source at location 10 to the home or building 22 by light waves having a length of at 1550 nanometers. Any return communication traveling on optical fibers 42 and 42A must be carried at a different wavelength of light such as 1310 nanometers which travels upstream to the TV signal source location 10. Likewise, if bidirectional communication is to take place on the single coaxial cable 12B between distribution terminal 20 and home or building 22, the transmission of such bidirectional communication transmission be at different frequencies. Thus, in the illustrated example, the 1550 nanometer light waves will be converted to electrical signals having a frequency band of between about 50 and 800 MHZ which travel in a single direction from distribution terminal 20 to the home or building 22. The return signals from the set or set-top box at building 22 are then carried at about 5 to 50 MHZ back to the distribution terminal 20 and then used to modulate light waves having a wavelength of 1310 nanometers. Thus, it is seen that it is possible by the use of a single fiber optic cable as well as using existing infrastructure copper wiring such as coaxial cable to transmit a broad frequency band of TV signals carrying multiple channels of TV information at one wavelength of light. The individual TV channels are then converted to electrical signals at a specific frequency within the 50–800 MHZ frequency band. Conversely, electrical control signals within the 5–50 MHZ frequency band are converted to light at a wavelength different from that provided in the downstream mode and transmitted back to the TV signal source location 10. The return wavelength of light in the illustrated example is 1310 nanometers.

Referring now to FIG. 3 there is shown a simplified block diagram of the preferred embodiment of the present invention which takes partial advantage of the existing telephone and coaxial TV distribution systems while also using a single optical fiber 42A for part of the transmission path between the TV signal source location 10 and the building or home 22. It should be noted that, although the following discussion is in terms of a single path for the coaxial or optical fiber cable between two locations 10 and 22, in actuality there may be a significant amount of multiplexing and de-multiplexing such that many, many subscribers or customers may be serviced by the single optical fiber and any other multiplexed cable. It should also be noted that there may also be several amplification stations located at various locations in the distribution path. As shown, TV signal source location 10 provides signals from equipment 12 and, in this illustrated embodiment, the TV signals may be 50 to 800 MHZ signals provided on copper wire, such as coaxial cable 16. Copper coaxial cable 16 carries the TV signals having a band width of 50 to 800 MHZ to a distribution terminal 18 which converts the electrical TV signals to light signals having a selected wavelength. In one preferred embodiment a particular selected wavelength is 1550 nanometers. Thus the light waves travel in a single direction from distribution terminal 18 or distribution terminal 20. Also as shown, electrical telephonic signals may be carried by copper wires such as copper wires 48 which represent a twisted pair of normal telephone communication wires to a substation 52 where electrical telephonic signals traveling in one direction are converted to light signals at a selected frequency and light signals at that same frequency traveling in the opposite direction are converted to electrical telephonic signals. Thus, the fiber optic cable 54 shown between distribution terminals 18 and 52 carries telephonic signals at a single wavelength of light typically selected to be about 1310 nanometers. The light signals at 1310 nanometers are able to travel in both directions on the single fiber optic cable 54 by the use of TCM (time compression multiplexing). Although TCM is not normally suitable for higher density signals such as TV signals, it is quite adequate for lower frequencies suitable for transmitting the human voice as well as frequencies up to about 50 to 64 KHz, which is above human hearing. Time compression multiplexing simply stated means that time is broken up in substantially two portions or cycles such that signals travel in one direction during one portion and in the opposite direction during the other portion. Thus, distribution terminal 18 receives fiber optic cable 54 carrying the 1310 TCM (time compression multiplexed) modulated light and also receives 50 to 800 MHZ TV signals from the TV signal source location 10. The 50 to 800 MHZ electrical signals are converted to light signals having a wavelength of 1550 nanometers. Thus, distribution terminal 18 also combines by WDM (wave division multiplexing) the 1310 nanometer signals with the 1550 nanometer signal such that cable 42A carries 1550 nanometer signals in a downstream direction and carries 1310 nanometer telephonic signals in both directions.

At distribution terminal 20, and as will be discussed in detail later, the 1550 nanometer downstream traveling signals are then reconverted to electrical TV signals having a band width of between 50 and 80 MHZ. They are then distributed to various locations including home or building 22 as was discussed with respect to FIG. 1 and 2 above. In a similar manner, the bidirectional TCM signals traveling on 1310 nanometer light waves are routed to other equipment in distribution terminal 20 which converts the 1310 nanometer light waves into electrical telephonic signals and converts electrical telephonic signals into light waves having a wavelength of 1310 nanometers. The electrical telephonic signals are then distributed from distribution box 20 by twisted wiring 32B to the telephone 30B or other telephonic equipment such as the computer modem 34 at home or building 22.

As was discussed with respect to the system of FIG. 2 above, it may be desirable to transmit certain types of television related control signals or "purchasing information" signals from the set-top box 28 or TV set 26 at building 22 back to the TV signal source location 10. As discussed earlier with respect to FIG. 2, such return information will have to be carried upstream at a different frequency band such as 2–50 MHZ on the copper cable 12B and on a wavelength different than 1550 nanometer on fiber optic cable 42A. Thus, in addition to the telephone service which travels on a wavelength of light of 1310 nanometers, distribution terminal 20 will also convert the 5 to 50 MHZ electrical TV related signals to light signals having a wavelength of 1310 nanometers. These light signals carrying the return TV related signals are then multiplexed with the telephone service also traveling at 1310 nanometers and the portion on the TCM cycle traveling from distribution terminal 20 to distribution terminal 18. At distribution terminal 18, the TV related control signals can be provided through fiber optic cable 1310 to distribution box 52 where they are converted to telephone electrical signals and then provided in a normal fashion to the TV equipment 12 or alternately distribution terminal 18 may split out the 5 to 50 MHZ signals from the 1310 wavelength of light and provide the signal on coaxial cable 16 which is carrying the downstream original television signals having frequency bands of 50 to 800 MHZ. These 5–50 MHZ signals traveling upstream go to the TV equipment 12.

Although in the embodiment shown in FIG. 3, the conversion between light waves and electrical signals for both telephone service and for TV signals is shown occurring at a remote distribution box 20, it will be appreciated that in the future it may be advantageous that a single fiber optic would be connected into a home or building 22 and the conversion from electrical signal to light signals and vice versa will take place in the building 22 itself as indicated by dotted line 55.

Thus, there has been discussed to this point generalized concepts for a new and improved telephonic and TV signal distribution systems.

Referring now to FIG. 4A and 4B, there is provided a more detailed description of the system of FIG. 3 discussed above. As shown, the TV signal source location 10 provides output TV signals at 50 to 800 MHZ traveling downstream on copper wire 12. The electrical signals are then provided to laser diode 56 where the electrical signal at 50 to 800 MHZ are converted to light having a wavelength of 1550 nanometers. The 1550 nanometer light is then eventually provided to a wave division multiplexer 58 which is also connected to optical fiber 54 carrying light at a wavelength of 1310 nanometers and will be discussed later. Although it is possible that the output of the light emitting diode 56 could be provided directly to a wave division multiplexor 58, typically the light would go through a light amplifier such as EDFA (erbium doped fiber amplifier) 60. The amplified light signal from amplifier 60 would then pass the light through a first light splitting circuit 62 and then again perhaps to another light splitting circuit 64 such as a SWX circuit. The output of the splitter 64 would then be provided to WDM 58. As shown, the output of WDM 58 is connected to light fiber 42A.

Also as shown, multiplexed telephone service POTS at the DS1 level (i.e. information from up to 24 TV customers) on copper wire 65 is provided to distribution box 52 wherein the electrical telephonic signals typically having a frequency band up to about 60 MHZ are provided to another laser diode 66. These electrical signals are then converted by laser diode 66 to light signals having a wavelength of 1310 nanometers. This light is provided to optical fiber 54 as shown. As was discussed earlier, telephone service is typically TCM (time compression multiplexing) so as to provide for bidirectional communication at a single wavelength of light. Therefore as shown, light traveling upstream and leaving optical fiber 54 is directed toward a photo or a light detection diode 68 which receives the light and converts the 1310 nanometer light to telephonic signals having a frequency of about 60 KHz or less. Thus, the input electrical signal to laser diode 66 from line 65 on the output electrical signal from light detector 68 on line 70B actually represents a typical pair of twisted wires 71 used in normal POTS telephonic service. In the embodiment shown, the output telephonic signals on line 70A is first provided to a diplex circuitry 72 where the TV related control signals from the customer are split out on line 74 and the regular telephonic communications such as voice and computer modem server continues on output line 70B. The 5–50 MHZ on line 74, is then provided to a band pass filter circuit 70 which will only pass the 5–50 MHz, and which has an output 78 provided to a combining circuitry 80 which receives other similar signals from other TV customers up to a total of at least 16 (8+8) customers. The output of combining circuitry 80 is then provided to an 8 bit 90 MSPS (megsamples per second) analog-to-digital converter 81. The digital signals from A/D converter 81 are then provided to a 90 MHZ 8 bit to 12 bit adder 82. Added 82 as shown can receive the output from 8 A/D converters such as A/D converter 82. Thus, it will be appreciated that the output from adder 82 going to the parallel to serial converter 84 will be carrying information related to at least 128 TV customers (16×8). The output of the P/S converter 84 may then provided to another E/O (electrical-to-optical) device 86 operating at 1 Gbps (giga bit per second). This output may then be transmitted by optical fiber 87 to CMTS (cable modem transmission source) at location 88 where the TV signal source 10 is also located. The light traveling through optical fiber 87 is then received by O/E (optical-to-electrical) converter 89 and the resulting electrical signals are provided to S/P (serial-to-parallel) converter 90. This parallel digital information is then provided to D/A converter 92, which in turn provides an analog signal to the TV signal source 10. This analog signal may of course be a control signal or other information related to a specific TV customer or subscriber.

Referring now to FIG. 4B, optical fiber 42A is shown being received at distribution panel 20. As shown optical fiber 42A is carrying television signals in one direction downstream by light having a wavelength of 1550 nanometers at the same time it carries bidirectional telephone communications using TCM (time compression multiplexing) by light having a wavelength of 1310 nanometers. As shown, the light having a wavelength of 1550 nanometers is directed towards a photo detector 94 which converts this light to electrical television signals having a band width of between 50 and 800 MHZ. These electrical television signals are then provided by coaxial cable 96 to a diplex circuit 98 which has an output 100 provided to splitting circuit 102. Also as shown and as will be discussed hereinafter diplex circuit 98 also separates out electrical signals having a frequency of between 5 and 50 MHZ traveling in the opposite direction. One of the outputs of splitter or distribution circuit 102 carrying the 50 to 800 MHZ electrical signals will then be provided to building or house 22 by means of coaxial cable 12B in the manner previously discussed. The television signals on coaxial cable 12B are then either provided to TV set 20 or to another TV-signal using device such as set-top box 28, and then to TV set 26. Also, in the building 22 there is shown a computer 104 connected to a computer modem 34 as was discussed heretofore with respect to FIG. 1 and which is also connected to the standard telephone lines or POTS lines 32B. Also as shown, a telephone 30B is connected to the POTS lines 32B. The RF return or TV related signals sent back to the TV source location 10 may result from several sources. One possible source is for the set-top box 28 to sense that the television signals being received need to be either decreased or increased in amplitude or strength. Alternately, it may be that the customer or user of the television decides to purchase a particular pay-on-demand movie. Still another source of information may be an input from the computer 104 provided to the set-top box carrying information or requesting information. Such information must be provided back to the TV source location 10. Set-top box 28 will convert the information into an electrical signal having a frequency band of between 5 and 50 MHZ which is inserted on coaxial cable 12B and transmitted to distribution terminal 20. It will be appreciated that coaxial cable 12B can carry information in both directions if the frequency band for the two directions is sufficiently separated. The 5–50 MHZ television related signals are then routed to the diplex circuitry 98 where the electrical signals having a frequency band of 5 to 50 MHZ are split out and provided to another combining multiplexing circuit 106.

Now referring again to the input cable 42A which, in addition to carrying light having a wavelength of 1550 nanometers as was previously discussed, is also carrying light at 1310 nanometers for the bidirectional telephone communication using TCM (time compression multiplexing). Thus, the light having a wavelength of 1310 nanometer is split and provided to a photo detector 108 which converts the 1310 nanometer light traveling downstream to telephonic electrical signals which travel on wires 109. These telephonic electrically signals will typically be POTS signals at the DS1 (up to 24 customers) or DS2 (up to 96 customers) level and are provided to the multiplexer 110 and eventually by means of wires 32B to the telephone circuitry in house or building 22. It should be appreciated that the wire 32B connecting home 22 to the distribution panel 20 is a normal twisted pair of telephone wires. The upstream traveling POTS service travels on wire 111 to multiplex circuit 106 where it is combined with the 5 to 50 MHZ signals and provided on output line 112 to a laser diode 114. Laser diode 114 then converts the electrical signals carrying the 5 to 50 MHZ television related signals as well as the telephonic signals to light having a wavelength of 1310 nanometers which light is then coupled again to fiber optic 42A. Thus, as was discussed earlier, the fiber optic 42A carries the upstream traveling 1310 nanometer light to distribution panel 18 where it is split out for both telephonic service and television related signal service.

Thus, there has been discussed to this point a new and novel communication transmission system using a single optical fiber as part of the communication path along with parts of an existing telephone communication system and parts of an existing cable TV distribution system.

I claim:

1. An optical distribution terminal, comprising:
   a transceiver coupled to an input fiber, the transceiver including:
      a first photodiode for receiving optical video signals transmitted on the input fiber at a first wavelength;
      a second photodiode for receiving optical telephony signals transmitted on the input fiber at a second wavelength; and
      a laser diode for transmitting multiplexed return signals on the input fiber at the second wavelength, the multiplexed return signals including telephony return signals and video return signals;
   distribution circuitry for transmitting the received video and telephony signals to a plurality of subscribers and for receiving the telephony return signals and the video return signals from the plurality of subscribers; and
   a multiplexer for combining the telephony return signals and the video return signals to generate the multiplexed return signals.

2. The optical distribution terminal of claim 1, further comprising:
   a diplexer coupled to the first photodiode and the multiplexer for routing the received video signals to the distribution circuitry, and also coupled to the multiplexer for routing the video return signals from the distribution circuitry.

3. The optical distribution terminal of claim 1, wherein the first wavelength is 1550 nm.

4. The optical distribution terminal of claim 1, wherein the second wavelength is 1310 nm.

5. The optical distribution terminal of claim 1, wherein the first photodiode converts the optical video signals into electrical video signals having a bandwidth between about 50 and 800 MHz.

6. The optical distribution terminal of claim 1, wherein the video return signals have a bandwidth between about 5 and 50 MHZ.

7. The optical distribution terminal of claim 1, wherein the second photodiode converts the optical telephony signals into electrical telephony signals.

8. A system for transmitting video and telephony signals between a central location and a plurality of subscribers, comprising:
   a fiber optic network coupled between the central location and a plurality of optical distribution terminals, wherein downstream video signals are transmitted over the fiber optic network at a first frequency, and wherein downstream telephony signals and upstream return video and telephony signals are transmitted over the fiber optic network at a second frequency;
   wherein the optical distribution terminals each include:
      a first optical-to-electrical converter for receiving the downstream video signals at the first frequency and for generating downstream electrical video signals;
      a second optical-to-electrical converter for receiving the downstream telephony signals at the second frequency and for generating downstream electrical telephony signals;
      distribution circuitry for transmitting the downstream electrical video and telephony signals to the plurality of subscribers;
      a multiplexer for receiving the upstream return video and telephony signals from the plurality of subscribers and for combining these signals into multiplexed upstream signals; and
      an electro-optical transmitter for transmitting the multiplexed upstream signals at the second frequency to the central location.

9. The system of claim 8, wherein the first optical-to-electrical converter is a photodiode.

10. The system of claim 9, wherein the second optical-to-electrical converter is a photodiode.

11. The system of claim 8, wherein the electro-optical transmitter is a laser diode.

12. The system of claim 8, wherein the first optical-to-electrical converter is a photodiode, the second optical-to-electrical converter is a photodiode, and the electro-optical transmitter is a laser diode.

13. The system of claim 8, wherein the first and second optical-to-electrical converters and the electro-optical transmitter are configured in a single optical device.

14. The system of claim 8, wherein the first frequency is 1550 nm and the second frequency is 1310 nm.

15. The system of claim 14, wherein the downstream electrical video signals have a bandwidth of about 50 to 800 MHz.

16. The system of claim 15, wherein the downstream electrical video signals have a bandwidth of about 5 to 50 MHz.

17. The system of claim 8, wherein each optical distribution terminal services a single subscriber.

18. The system of claim 8, wherein each optical distribution terminal services a plurality of subscribers.

19. The system of claim 17, wherein the optical distribution terminal is located at the subscriber's location.

20. The system of claim 18, wherein the optical distribution terminals are located remote from the subscribers' location.

21. The system of claim 8, further comprising:
   a coaxial cable plant coupling the plurality of optical distribution terminals to the subscribers, wherein the downstream electrical video signals and the return video signals are transported on the coaxial cable plant.

22. The system of claim 21, further comprising:
   a plurality of twisted pairs of wires coupling the plurality of optical distribution terminals to the subscribers, wherein the downstream electrical telephony signals and the upstream return telephony signals are transported on the plurality of twisted pairs of wires.

23. An electro-optical transceiver, comprising:
   an optical coupler for connecting the electro-optical transceiver to an optical fiber;
   a first photodiode for receiving optical signals from the optical fiber at a first frequency and for generating electrical signals having a first bandwidth;
   a second photodiode f or receiving optical signals from the optical fiber at a second frequency and for generating electrical signals having a second bandwidth; and
   a laser diode for transmitting multiplexed electrical signals at a third bandwidth onto the optical fiber at the second frequency.

* * * * *